United States Patent
Ihle et al.

(10) Patent No.: US 9,958,335 B2
(45) Date of Patent: May 1, 2018

(54) TEMPERATURE PROBE AND METHOD FOR PRODUCING A TEMPERATURE PROBE

(71) Applicant: EPCOS AG, Munich (DE)

(72) Inventors: Jan Ihle, Grambach (AT); Gerald Kloiber, Feldkirchen (AT)

(73) Assignee: EPCOS AG, Munich (DE)

( * ) Notice: Subject to any disclaimer, the term of this patent is extended or adjusted under 35 U.S.C. 154(b) by 426 days.

(21) Appl. No.: 14/442,346

(22) PCT Filed: Sep. 27, 2013

(86) PCT No.: PCT/EP2013/070245
§ 371 (c)(1),
(2) Date: May 12, 2015

(87) PCT Pub. No.: WO2014/072123
PCT Pub. Date: May 15, 2014

(65) Prior Publication Data
US 2016/0299011 A1    Oct. 13, 2016

(30) Foreign Application Priority Data
Nov. 12, 2012    (DE) .................. 10 2012 110 849

(51) Int. Cl.
*G01K 1/08*    (2006.01)
*G01K 7/22*    (2006.01)

(52) U.S. Cl.
CPC .................... *G01K 1/08* (2013.01); *G01K 7/22* (2013.01)

(58) Field of Classification Search
CPC . G01K 1/08; G01K 7/22; G01K 7/223; B28B 1/24; C04B 35/10; C04B 35/64
See application file for complete search history.

(56) References Cited

U.S. PATENT DOCUMENTS 5,142,266 A  *  8/1992  Friese .................... G01K 7/223
                                                    338/22 R
5,406,246 A  *  4/1995  Friese ..................... G01K 7/18
                                                    29/612
(Continued)

FOREIGN PATENT DOCUMENTS

CN    101484784 A    7/2009
CN    102052972 A    5/2011
(Continued)

OTHER PUBLICATIONS

Sang, A., "Research on Red Ceramic Pigment $YA1\_1\_x\_C\_xO\_3$ of Perovskite Type," Shangdong Ceramics, Aug. 31, 2009, pp. 11-14, vol. 32, No. 4.

(Continued)

*Primary Examiner* — Lisa Caputo
*Assistant Examiner* — Philip Cotey
(74) *Attorney, Agent, or Firm* — Slater Matsil, LLP

(57) ABSTRACT

The invention relates to a temperature probe comprising two first ceramic plates, a second ceramic plate arranged between the first ceramic plates, and two third ceramic plates. Each of the two first ceramic plates comprises an opening in each in which an NTC sensor element is arranged. An electrode is arranged between the second ceramic plate and each of the first ceramic plates. The first and the second ceramic plates are arranged between the two third ceramic plates. An electrode is arranged between each third ceramic plate and a first ceramic plate. Each electrode electrically contacts an NTC sensor element. Each NTC sensor element is enclosed by ceramic plates. The first, the second and the third ceramic plates and the NTC sensor elements are sintered to form a ceramic body. The invention further relates to a method for producing a temperature probe.

19 Claims, 5 Drawing Sheets

(56) References Cited

U.S. PATENT DOCUMENTS

| | | | | |
|---|---|---|---|---|
| 5,410,291 | A * | 4/1995 | Kuzuoka | G01D 11/245 338/22 R |
| 5,610,571 | A * | 3/1997 | Kuzuoka | G01D 11/245 338/22 R |
| 5,823,680 | A * | 10/1998 | Kato | G01K 7/183 338/17 |
| 5,887,338 | A * | 3/1999 | Wildgen | G01K 7/223 29/412 |
| 8,134,446 | B2 * | 3/2012 | Kloiber | G01K 1/14 29/612 |
| 2002/0075129 | A1 * | 6/2002 | Mizoguchi | G01K 1/16 338/25 |
| 2002/0101326 | A1 * | 8/2002 | Lavenuta | G01K 7/226 338/22 R |
| 2003/0128098 | A1 * | 7/2003 | Lavenuta | G01K 7/226 338/22 SD |
| 2004/0172807 | A1 * | 9/2004 | Rosc | H01C 1/1413 29/619 |
| 2006/0021691 | A1 * | 2/2006 | Sakurai | C04B 35/6261 156/89.11 |
| 2006/0139144 | A1 * | 6/2006 | LaBarge | G01K 7/16 338/308 |
| 2007/0171959 | A1 * | 7/2007 | Irrgang | G01K 1/10 374/185 |
| 2007/0175019 | A1 * | 8/2007 | Rosc | H01C 1/1413 29/619 |
| 2008/0295949 | A1 * | 12/2008 | Sakurai | C04B 35/6261 156/89.12 |
| 2009/0148657 | A1 * | 6/2009 | Ihle | B28B 1/24 428/131 |
| 2009/0173526 | A1 * | 7/2009 | Kloiber | G01K 1/14 174/260 |
| 2010/0029464 | A1 * | 2/2010 | Shibasaki | C04B 35/4682 501/139 |
| 2010/0123543 | A1 * | 5/2010 | Kloiber | G01K 7/223 338/22 R |
| 2011/0273265 | A1 * | 11/2011 | Fujita | C01G 25/02 338/22 SD |
| 2011/0309718 | A1 * | 12/2011 | Ogawa | H01C 1/14 310/311 |

FOREIGN PATENT DOCUMENTS

| | | |
|---|---|---|
| CN | 102216747 A | 10/2011 |
| DE | 3733193 C1 | 11/1988 |
| DE | 4329312 A1 | 3/1994 |
| DE | 19740262 C1 | 4/1999 |
| DE | 102006031344 A1 | 1/2008 |
| DE | 102010030769 A1 | 1/2012 |
| EP | 2038624 A2 | 3/2009 |
| JP | H0682315 A | 3/1994 |
| JP | 10-142074 | 5/1998 |
| JP | 2009543322 A | 12/2009 |
| JP | 2012004330 A | 1/2012 |
| WO | 2008003287 A2 | 1/2008 |

OTHER PUBLICATIONS

Feteira, A., "Negative Temperature Coefficient Resistance (NTCR) Ceramic Thermistors: An Industrial Perspective," Journal American Ceramic Society, 92 (5), pp. 967-983, Jan. 15, 2009.

* cited by examiner

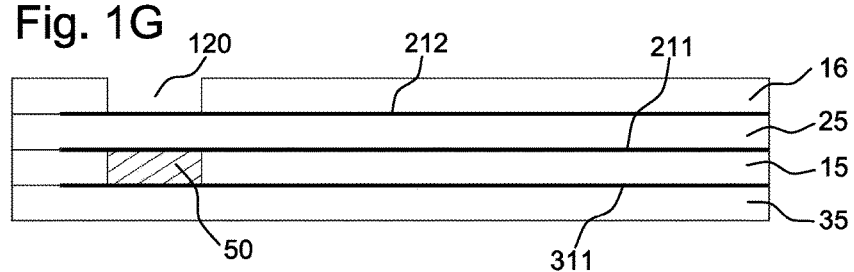
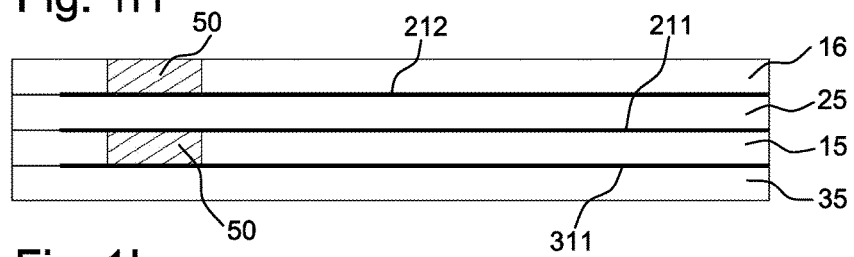
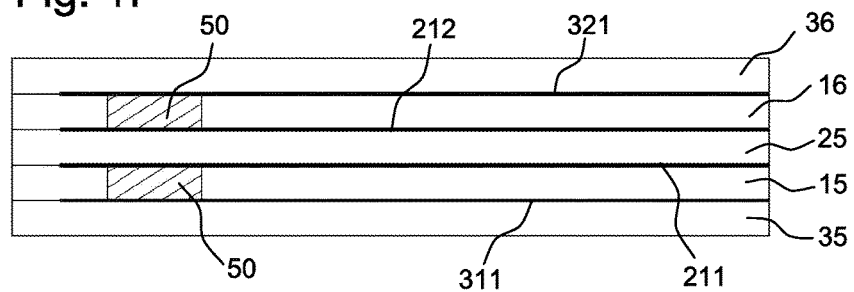
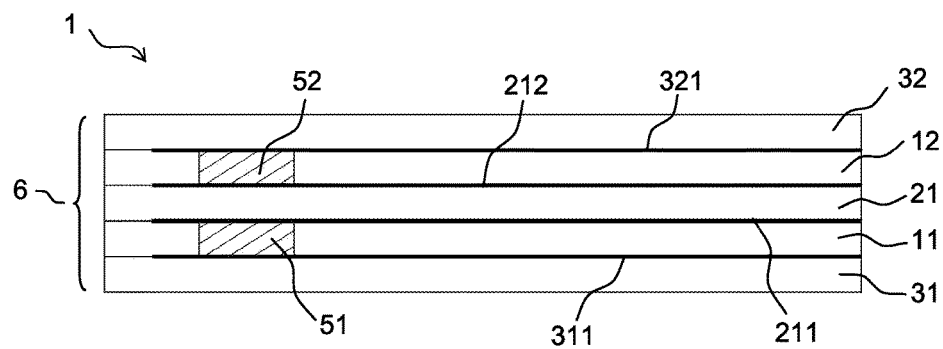

TEMPERATURE PROBE AND METHOD FOR PRODUCING A TEMPERATURE PROBE

This patent application is a national phase filing under section 371 of PCT/EP2013/070245, filed Sep. 27, 2013, which claims the priority of German patent application 10 2012 110 849.8, filed Nov. 12, 2012, each of which is incorporated herein by reference in its entirety.

TECHNICAL FIELD

The present invention relates to a temperature sensor system including a temperature probe and a method for producing the same.

BACKGROUND

The measurement of temperatures for monitoring and regulating in greatly varying applications is performed, for example, using ceramic hot conductor thermistor elements ("negative temperature coefficient thermistors" or "NTC thermistors"), silicon temperature sensors (for example, so-called KTY temperature sensors), platinum temperature sensors ("platinum resistance temperature detectors" or "PRTDs"), or thermocouples ("TCs"). For sufficient mechanical stability, for protection against external influences, and to avoid corrosion by aggressive media and to avoid temperature-related material changes due to the gas atmosphere in an NTC material or in an electrode, ceramic sensor elements are typically provided with a coating made of a polymer or a glass. The maximum usage temperatures of such sensor elements are limited in the case of a polymer shell to approximately 200° C. and in the case of a glass shell to approximately 500° C. to 700° C.

The described sensor elements cannot readily be used continuously for measuring very high temperatures and/or in particularly aggressive media, however. To nonetheless be able to use them in aggressive media, the sensor elements are often installed in a plastic or stainless steel housings. To produce a thermal contact to the element, potting materials are additionally very frequently used. A significant disadvantage of the systems thus constructed is the delayed response time thereof because of the additional structure-related heat transfers and the low heat conduction of the materials used.

To achieve the lowest possible resistance tolerance of the sensor elements, during the production thereof, the resistance can be readjusted, before the sensor elements are enveloped, by mechanical machining, for example, by trimming, by grinding, or, in the case of glass-enveloped sensor elements, by tempering. A readjustment of the resistance of already enveloped sensors is only possible to a limited extent, however.

SUMMARY

Embodiments of the present invention include temperature probes which have a high robustness and a low response time. A method for producing temperature probes is described.

A temperature probe according to at least one embodiment comprises at least two first ceramic plates, which each have an opening. An NTC sensor element is preferably arranged in each of the openings. The openings can each be a cavity, for example, which extends from one surface of the ceramic plate to an opposing surface of the ceramic plate. The openings are each enclosed in the lateral direction, i.e., in a direction parallel to the main extension direction of the first ceramic plates, by the material of the respective first ceramic plate, so that the respective NTC sensor element is also enclosed in the lateral direction by the material of the respective first ceramic plate. Furthermore, the temperature probe comprises at least one second ceramic plate, which is arranged between the first ceramic plates. The second ceramic plate is preferably arranged directly between the two first ceramic plates, i.e., no further ceramic plates are arranged between the one of the two first ceramic plates and the second ceramic plate and between the second ceramic plate and the further one of the two first ceramic plates. An electrode is arranged in each case between the second ceramic plate and the two first ceramic plates, these electrodes each electrically contacting one of the NTC sensor elements.

The temperature probe furthermore comprises two third ceramic plates. The first and the second ceramic plates are arranged between the two third ceramic plates. In this case, no further ceramic plates are preferably arranged between the first and the third ceramic plates. The first, the second, and the third ceramic plates preferably form a layer stack. An electrode is arranged in each case between the third ceramic plates and the first ceramic plates, these electrodes each electrically contacting one of the NTC sensor elements. The electrodes arranged between the second ceramic plate and the first ceramic plates and also the electrodes arranged between the first and third ceramic plates can comprise or consist of, for example, one or more materials selected from Cu, Ag, Au, Pt, Mo, and W. Furthermore, the electrodes can comprise a metal alloy, for example, AgPd, or can consist of a metal alloy. For example, the electrodes can be applied by means of a screen printing method.

The NTC sensor elements are preferably each completely enclosed by the ceramic plates. In particular, the NTC sensor elements can each have multiple lateral surfaces, which are each all enclosed by ceramic plates. The NTC sensor elements can thus be embedded inside the ceramic plates. Furthermore, the first, the second, and the third ceramic plates and the NTC sensor elements are sintered to form a ceramic body. The first, the second, and the third ceramic plates and also the NTC sensor elements are preferably sintered in a joint sintering process to form the ceramic body, wherein the ceramic plates and the NTC sensor elements are provided before this joint sintering process as materials which are not yet sintered, for example, as ceramic films which are not yet sintered in the case of the ceramic plates or as ceramic sensor materials which are not yet sintered in the case of the NTC sensor elements.

Production costs of the temperature probe can advantageously be kept low due to the use of NTC sensor elements. A further advantage of NTC sensor elements in relation, for example, to thermocouples or metallic resistor elements, for example, Pt elements, is a pronounced negative resistance-temperature characteristic.

According to a further embodiment, the temperature probe comprises a plurality of at least three first ceramic plates and a plurality of second ceramic plates. The at least three first ceramic plates each have an opening, in which an NTC sensor element is arranged. The first and second ceramic plates are arranged alternately one on top of another between the third ceramic plates. In this case, each second ceramic plate is arranged directly between two first ceramic plates. Furthermore, an electrode for contacting the respective NTC sensor element is arranged in each case between the first and second ceramic plates.

According to a further embodiment, the temperature probe comprises at least two fourth ceramic plates, wherein the first, second, and third ceramic plates are arranged between the at least two fourth ceramic plates. The two fourth ceramic plates are preferably each arranged in direct contact with the lateral surfaces of the third ceramic plates facing away from the first ceramic plates. For example, the fourth ceramic plates have the same shape and size as the third ceramic plates and are connected over the entire surface to the third ceramic plates, wherein no further elements are arranged between the third and fourth ceramic plates, which are in contact. The fourth ceramic plates are preferably sintered jointly with the ceramic plates arranged in between and with the NTC sensor elements to form the ceramic body. The temperature probe can additionally have further fourth ceramic plates, wherein the first, the second, or the second, the third, and the fourth ceramic plates are arranged between the further fourth ceramic plates. The further fourth ceramic plates are preferably also jointly sintered with the ceramic plates arranged in between and with the NTC sensor elements. The stability and robustness of the temperature probe can be increased by means of the fourth ceramic plates.

According to a further embodiment, the NTC sensor elements have a perovskite structure comprising the elements Y, Ca, Cr, Al, O. Furthermore, the NTC sensor elements based on perovskites can comprise the element Sn.

According to a further embodiment, the NTC sensor elements each comprise a ceramic material having a perovskite structure of the general chemical formula $ABO_3$. In particular for high-temperature-stable temperature probes, which are to be suitable for high application temperatures, NTC sensor elements having such a ceramic material are preferred. The NTC sensor elements particularly preferably have the composition $(Y_{1-x}Ca_x)(Cr_{1-y}Al_y)O_3$ with x=0.03 to 0.05 and y=0.85.

According to a further embodiment, the NTC sensor elements have a spinel structure comprising the elements Ni, Co, Mn, O. The NTC sensor elements based on spinels can furthermore comprise one or more of the following elements: Al, Fe, Cu, Zn, Ca, Zr, Ti, Mg.

According to a further embodiment, the NTC sensor elements each comprise a ceramic material having a spinel structure of the general chemical formula $AB_2O_4$ or $B(A, B)O_4$. NTC sensor elements having such a ceramic material are preferred in particular in the case of a temperature probe having application temperatures. According to a particularly preferred embodiments, the NTC sensor elements have the composition $Co_{3-(x+y)}Ni_xMn_yO_4$ with x=1.32 and y=1.32.

The sensor elements can in particular all comprise the same material. However, it is also conceivable that at least two sensor elements comprise different materials.

According to a further embodiment, the ceramic plates comprise a ceramic having a high thermal conductivity or consist of a ceramic having a high thermal conductivity. For example, the ceramic plates can comprise or consist of a ceramic of the type "HTCC" ("high temperature co-fired ceramic"). According to a particularly preferred exemplary embodiment, the ceramic plates comprise aluminum oxide or consist of aluminum oxide. The aluminum oxide advantageously has a purity of at least 95% to 99.9% or higher. In the case of a higher purity, the robustness with respect to the mechanical strength and chemical resistance of the temperature probe advantageously increases. In particular for the case in which the NTC sensor element comprises a ceramic having perovskite structure, it is preferable for the ceramic plates to comprise a ceramic of the type "HTCC", in particular aluminum oxide. Furthermore, it is also possible to use a ceramic of the type "HTCC" having a spinel structure.

According to a further embodiment, the ceramic plates comprise a glass ceramic or consist of a glass ceramic. For example, the ceramic plates can comprise or consist of an low temperature co-fired ceramic ("LTCC") glass ceramic, for example, LTCC-GBC ("glass bonded ceramics"). Ceramic plates which comprise a glass ceramic are preferred in particular in the case of NTC sensor elements having spinel structure. The glass ceramic is preferably adapted with respect to its sintering temperature to the sintering temperature of the NTC sensor elements.

A temperature probe described here advantageously also has particularly good long-term stability in aggressive media at temperatures up to 1200° C. due to the full ceramic encapsulation of the NTC sensor elements.

Furthermore, the response times are very low because of the full ceramic encapsulation and the material bond established therein to the NTC sensor elements and can be, for example, depending on the number, thickness, and material of the ceramic plates, less than three seconds, advantageously less than one second. In the case of very thin thicknesses of the ceramic plates and/or a low number of fourth ceramic plates, the response time of the temperature probe can even be only a few milliseconds.

According to a further embodiment, the ceramic plates have a thickness between 10 μm and 100 μm. According to a particularly preferred embodiment, the ceramic plates have a thickness between 15 μm and 30 μm. Particularly low response times of the temperature probe can thus advantageously be achieved.

According to a further embodiment, the NTC sensor elements each have a distance of at least 0.2 mm to all surfaces of the temperature probe. A sufficient robustness of the temperature probe can thus be achieved.

According to a further embodiment, the temperature probe has two terminal caps applied to the ceramic body. The terminal caps are preferably each electrically conductively connected at least to two electrodes. The terminal caps can be applied to an end of the temperature probe and can each partially cover four sides of the temperature probe, for example. The terminal caps are used for the external electrical contacting of the temperature probe. For example, the terminal caps can be produced by means of an immersion process in a metallization paste, by means of sputtering, by means of flame spraying, or by means of plasma spraying.

According to a further embodiment, the resistance of the temperature probe is settable by mechanical machining of at least one of the terminal caps. The mechanical machining can be, for example, a trimming or grinding process. To set the resistance tolerance, for example, the resistance of the temperature probe can be measured at rated temperature and simultaneously or subsequently at least one of the terminal caps can be ground off until the resistance lies within a desired tolerance. In this case, one or more electrical connections to one or more electrodes are mechanically disconnected. The temperature probe can thus advantageously be manufactured with very narrow resistance tolerances. For example, tolerances of less than 1%, and advantageously down to 0.1%, may be achieved.

Furthermore, a method for producing a temperature probe is specified. The temperature probe which is thus producible or produced can comprise one or more features of the above-mentioned embodiments. The embodiments described above and hereafter apply equally to the temperature probe and also to the method for producing the temperature probe.

According to a further embodiment, at least two first ceramic films, at least one second ceramic film, and at least two third ceramic films are provided. For example, the ceramic films are produced by means of a film casting process or by means of a film drawing process, preferably with the aid of organic binders. In a further method step, an opening is stamped out in each of the first ceramic films. The openings are preferably cavities, which each extend from one surface of a first ceramic film to an opposing surface of the same first ceramic film.

According to a further embodiment, in a further method step, an electrode is applied, for example, by means of a screen printing method, to one of the third ceramic films. Subsequently, one of the two first ceramic films is arranged directly on the one third ceramic film, wherein the electrode applied to the one third ceramic film is arranged at least partially in the opening of the one first ceramic film. Ceramic sensor material is then applied in the opening of the first film, so that the ceramic sensor material at least partially covers the electrode of the one third ceramic film. In this case, the ceramic sensor material is preferably applied by means of a screen printing method. In a following method step, a further electrode is applied to the one first ceramic film by means of a screen printing method, so that the further electrode contacts the ceramic sensor material. The second ceramic film is subsequently applied to the one first ceramic film.

According to a further embodiment, in a further method step, an electrode is applied to the second ceramic film, preferably by means of a screen printing method. In a next method step, the further first ceramic film is applied to the second ceramic film such that the electrode applied to the second ceramic film is arranged inside the opening of the further first ceramic film. Subsequently, ceramic sensor material is again applied in the opening, so that the ceramic sensor material is in contact with the electrode located underneath. In a further method step, the second of the third ceramic films is applied to the first ceramic film. By way of the described method steps, a composite results of ceramic films stacked one on top of another and embedded sensor materials. The arrangement of a ceramic film on another ceramic film can be performed by means of lamination, for example.

According to a further embodiment, the produced composite made of ceramic films stacked one on top of another and embedded sensor materials is compressed. A good material composite can thus advantageously be ensured.

According to a further embodiment, the composite made of ceramic films stacked one on top of another and embedded sensor materials is freed of organic components by means of a thermal debindering process.

According to a further embodiment, the composite made of ceramic films and sensor material is jointly sintered. In this case, the ceramic films are sintered to form the above-described ceramic plates, which are bonded to one another. The sintering is preferably performed at a temperature between 1600° C. and 1700° C., in particular if the ceramic sensor materials, which form the NTC sensor elements after the sintering, comprise a ceramic of the type "HTCC", for example, having a perovskite structure or a spinel structure. Alternatively, the sintering is performed at a temperature between 1200° C. and 1250° C., in particular if the ceramic sensor materials or the NTC sensor elements comprise a ceramic of the type "LTCC", for example, having a spinel structure.

According to a further embodiment, at least two terminal caps are applied to the ceramic body after the sintering. For this purpose, the ceramic body is immersed in a metallization paste and the applied metallization paste is subsequently fired. According to a further embodiment, the terminal caps are applied by means of sputtering, by means of flame spraying, or by means of plasma spraying. Each of the terminal caps preferably contacts at least two electrodes. The NTC sensor elements are connected in parallel by means of the two terminal caps. The terminal caps are used for the external electrical contacting of the NTC sensor elements.

According to a further embodiment, in addition to the first, the second, and the third ceramic films, furthermore at least two fourth ceramic films are provided. In a method step, which is performed before the step of arranging the first ceramic film on the one third ceramic film, the one third ceramic film is arranged directly on one of the fourth ceramic films. Furthermore, in a method step, which is performed after the step of arranging the further third ceramic film on the further first ceramic film, the further of the fourth films is arranged directly on the further third film. Subsequently, the composite made of first, second, third, and fourth ceramic films is sintered to one another while forming the above-described ceramic plates. The fourth ceramic films are used as base films and cover films and advantageously stabilize the temperature probe.

A plurality of at least three first ceramic films and a plurality of at least two second ceramic films according to the above description can also be applied alternately to one another between the third ceramic films, to arrange at least three sensor elements one on top of another.

According to a further embodiment, the resistance of the temperature probe is measured, preferably at rated temperature. Subsequently, the resistance of the temperature probe can be set by mechanical machining of at least one of the terminal cap(s). The terminal cap(s) can be mechanically machined until the resistance of the temperature probe lies within a tolerance value. The mechanical machining of the terminal cap(s) can be performed, for example, by grinding or trimming.

By way of the production of the temperature probe by means of the ceramic multilayer technology described here, a very small construction of the temperature probe having a high mechanical strength is advantageously producible. Furthermore, in particular by way of an achieved stable sheathing of the NTC sensor elements, good long-term media resistance and robustness of the temperature probe are achieved in conjunction with a low response time. For example, the temperature sensor described here is usable at up to approximately 1100° C., even in particularly aggressive media or gases, due to a full ceramic encapsulation of the NTC sensor elements. Furthermore, temperature probes having very narrow resistance tolerances may advantageously be produced, which may be set via the terminal caps.

According to a further embodiment, a plurality of temperature probes is produced, by stamping out a plurality of openings in each of the first ceramic films and, after the first ceramic films are arranged on the third ceramic film, introducing ceramic sensor material into each of the plurality of openings. The composite made of ceramic films is separated by a cutting process to form individual elements before the sintering process and/or the debindering process.

Further advantages and advantageous embodiments of the temperature probe result from the embodiments described hereafter in conjunction with FIGS. 1A to 6.

BRIEF DESCRIPTION OF THE DRAWINGS

In the figures:

FIGS. 1A to 1J show a method for producing a temperature probe according to one exemplary embodiment;

DETAILED DESCRIPTION OF ILLUSTRATIVE EMBODIMENTS

Figure 1A:
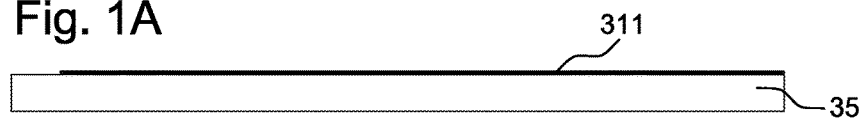
Figure 1B:
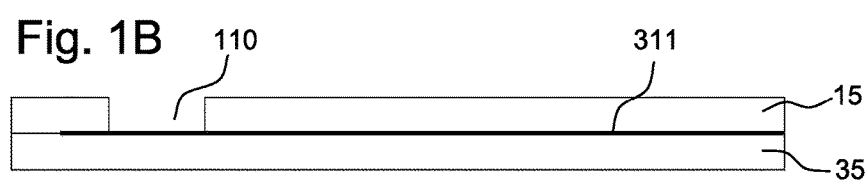

In the exemplary embodiments and figures, identical or identically acting components can each be provided with the same reference signs. The illustrated elements and the size relationships to one another are fundamentally not to scale. Rather, individual elements, for example, layers, components, and regions, can be shown dimensioned exaggeratedly thick or large for better illustration ability and/or for better comprehension.

FIGS. 1A to 1J show a method for producing a temperature probe 1 according to exemplary embodiments. In this case, two first ceramic films 15 and 16, which each have an opening 110 and 120 respectively, a second ceramic film 25, two third ceramic films 35 and 36, and ceramic sensor material 50, are provided. The ceramic films 15, 16, 25, 35 and 36 comprise aluminum oxide. Alternatively, ceramic films 15, 16, 25, 35 and 36 can comprise another ceramic material, preferably having good thermal conductivity, or a glass ceramic. The ceramic films 15, 16, 25, 35 and 36 can be produced, for example, by means of a film casting process or by means of a film drawing process and have a thickness between 10 μm and 100 μm, preferably between 15 μm and 30 μm.

The ceramic sensor material 50 has a perovskite structure comprising the elements Y, Ca, Cr, Al, O. In particular, the ceramic sensor material 50 has the composition $(Y_{1-x}Ca_x)(Cr_{1-y}Al_y)O_3$ with x=0.03 to 0.05 and y=0.85. Alternatively, the ceramic sensor material 50 can have a spinel structure comprising the elements Ni, Co, Mn, O. Such ceramic sensor material 50 can have, for example, the composition $Co_{3-(x+y)}Ni_xMn_yO_4$ with x=1.32 and y=1.32.

Figure 1C:
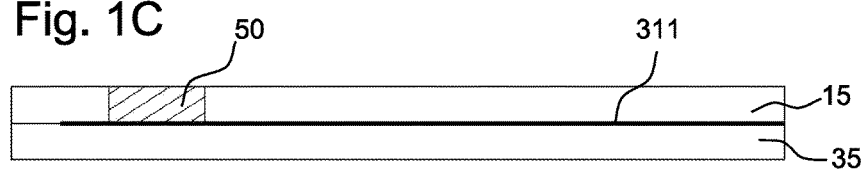

In a first method step, which is shown in FIG. 1A, an electrode 311 is applied by means of a screen printing method to one of the third ceramic films 35. One of the first ceramic films 15 is then applied in a method step shown in FIG. 1B to the one third ceramic film 35 such that the electrode 311 is at least partially arranged inside the opening 110 of the one first ceramic film 15. In a further method step, which is shown in FIG. 1C, ceramic sensor material 50 is introduced into the opening 110, so that the ceramic sensor material 50 touches the electrode 311. Subsequently, in a method step shown in FIG. 1D, an electrode 211 is again applied by means of a screen printing method to the one first ceramic film 15, so that the electrode 211 touches the ceramic sensor material 50. Subsequently, in the method step according to FIG. 1E, the second ceramic film 25 is arranged on the one first ceramic film 15. In a method step following thereon, which is shown in FIG. 1F, an electrode 212 is applied to the second ceramic film 25. Subsequently, the further first ceramic film 16, which has the opening 120, is applied in the method step shown in FIG. 1G to the second ceramic film 25, so that the electrode 212 is at least partially arranged inside the opening 120. In the method step shown in FIG. 1H, sensor material 50 is again introduced by means of a screen printing method into the opening 120. In a further method step shown in FIG. 1I, the further third film 36 is applied to the further first ceramic film 16. Subsequently, the composite made of ceramic films is sintered, in the method step shown in FIG. 1J, to form a ceramic body 6, wherein the first, the second, and the third ceramic films 15, 16, 25, 35 and 36 are sintered to form first, second, and third ceramic plates 11, 12, 21, 31 and 32, which are bonded to one another. The ceramic sensor material 50 becomes NTC sensor elements 51 and 52 during the sintering.

Figure 1D:
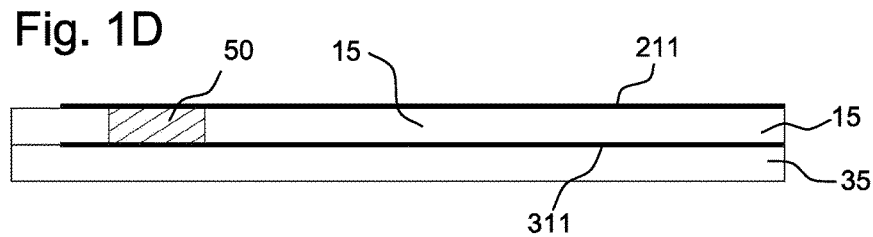
Figure 1E:
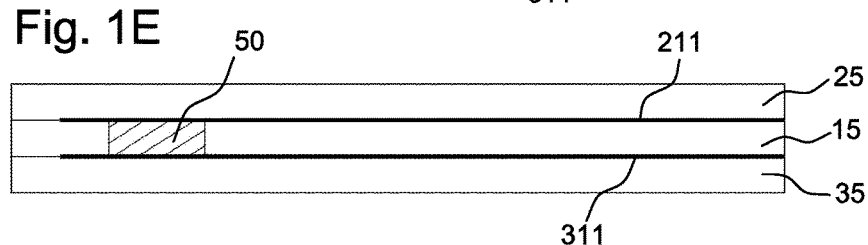
Figure 1F:
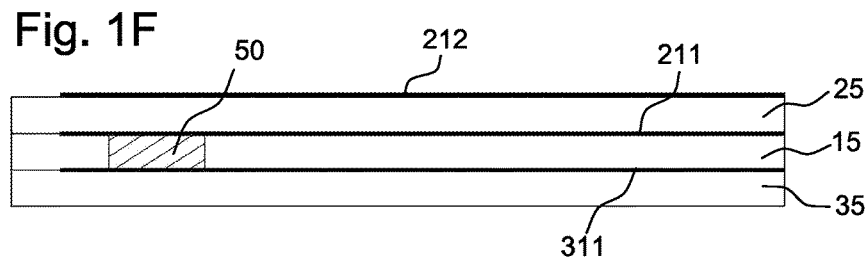

Alternatively to the method steps shown in FIGS. 1D and 1E, it is also possible to arrange a second ceramic film 25, which is already printed with an electrode 211, on the first ceramic film 15 having the ceramic sensor material 50.

Figure 2:
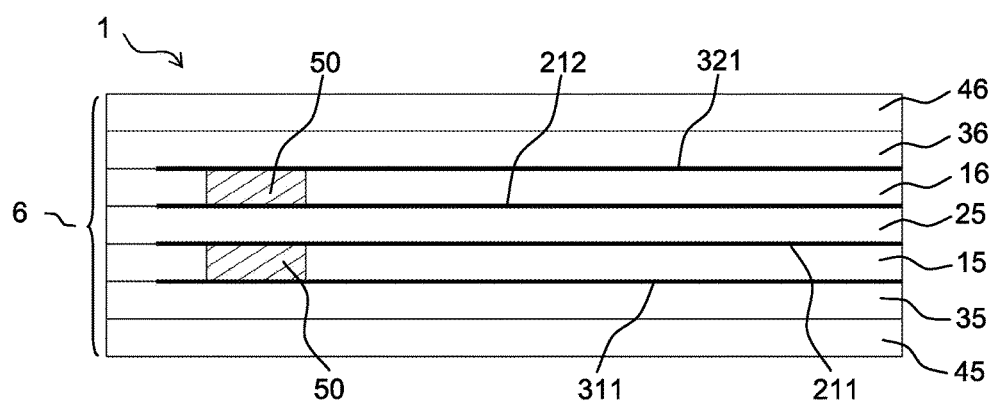
FIG. 2 shows a further method step of a method for producing a temperature probe according to further exemplary embodiment.

Furthermore, it is possible that, as shown in FIG. 2, two fourth ceramic films 45, 46 are provided and the one third ceramic film 35 is applied to one of the fourth ceramic films 45 in a method step, which is performed before the method step shown in FIG. 1A. Subsequently, the method steps already explained in conjunction with FIGS. 1A to 1I follow, before the further fourth ceramic film 46 is applied to the further third ceramic film 36 in a further method step, which is performed before the joint sintering of the composite made of ceramic films. The fourth ceramic films 45 and 46 thus form a base and cover film of the composite made of ceramic films. Subsequently, the ceramic films 15, 16, 22, 35, 36, 45 and 46 and the sensor material 50 embedded in the ceramic films 15, 16, 22, 35, 36, 45 and 46 are jointly sintered to form a ceramic body 6.

The sintering is performed, depending on the selection of the ceramic material, in the case of a ceramic of the "LTCC" type, for example, at a temperature between 1100° C. and 1300° C., for example, between 1200° C. and 1250° C. Alternatively, the sintering can be performed, in the case of a ceramic of the "HTCC" type, at a temperature between 1600° C. and 1700° C.

Subsequently, at least two terminal caps 71 and 72 are applied to the ceramic body 6 by means of an immersion method by immersion in a metallization paste, so that the terminal caps 71 and 72 are each electrically conductively connected to at least two of the electrodes 211, 212, 311 and 321. Alternatively, the terminal caps 71 and 72 can also be applied by means of sputtering, by means of flame spraying, or by means of plasma spraying.

Subsequently, the resistance of the temperature probe 1 thus produced is measured at rated temperature. Then, the resistance of the temperature probe 1 is set by mechanical machining of at least one of the terminal caps 71 and 72 until the resistance of the temperature probe 1 lies within a predefined tolerance value. The mechanical machining of the at least one of the terminal caps 71 and 72 can be performed, for example, by grinding or trimming. During the mechanical machining of the at least one of the terminal caps 71 and 72, one or more connections to the electrodes 211, 212, 311 and 321 are mechanically disconnected. Tolerances of less than 1%, advantageously down to 0.1%, may thus be set.

Figure 3:
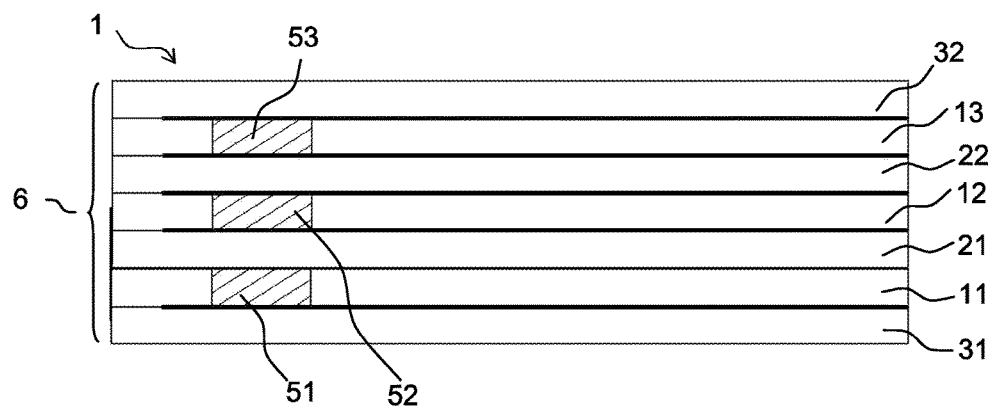
FIG. 3 shows a sectional view of a temperature probe according to a further exemplary embodiment.

FIG. 3 shows a sectional view of a temperature probe 1 according to further exemplary embodiments, which can be produced, for example, by the methods described in conjunction with FIGS. 1A to 1J. The temperature probe 1 has three first ceramic plates 11, 12 and 13, which each laterally enclose an NTC sensor element 51, 52 and 53. A second ceramic plate 21 and 22 is arranged in each case between the first ceramic plates 11, 12 and 13.

Figure 4:
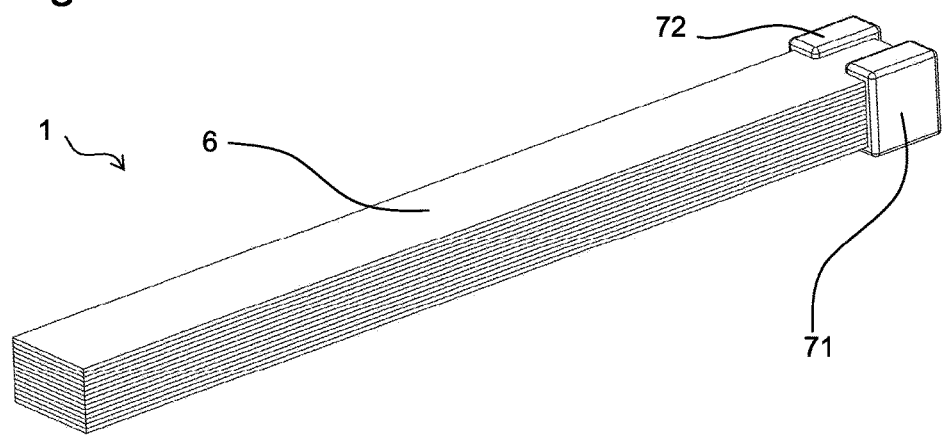
FIG. 4 shows a schematic view of a temperature probe according to a further exemplary embodiment.

FIG. 4 shows a temperature probe 1, which can be produced, for example, by the methods described in conjunction with FIGS. 1A to 1J and 2. The temperature probe 1 has first, second and third ceramic plates 11, 12, 21, 31 and 32, which are sintered to form a ceramic body 6, and NTC sensor elements 51 and 52 embedded in the ceramic body 6, as well as two terminal caps 71 and 72 applied to the ceramic body. The external dimensions of the temperature probe 1 are 10 mm×1 mm×0.45 mm (length×width×height) and the NTC sensor elements 51 and 52 each have a distance of at least 0.2 mm to the surface of the ceramic body 6.

Figure 5:
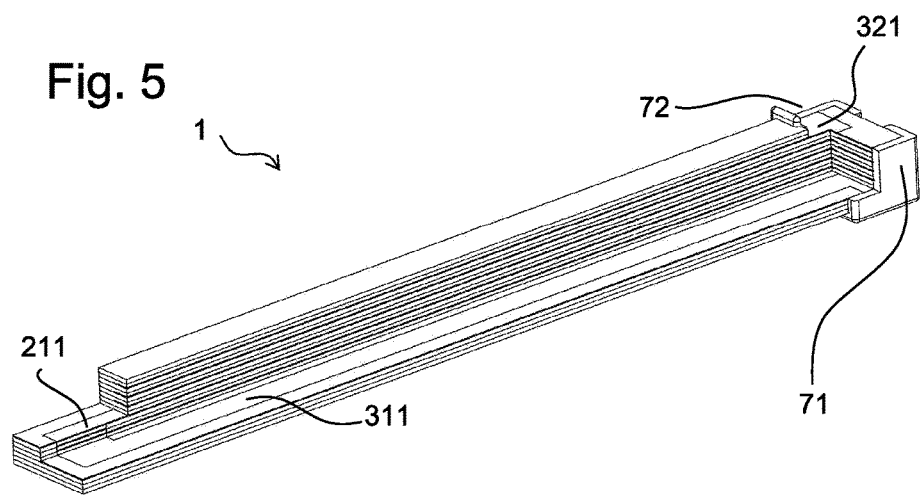
FIG. 5 shows a schematic view of the temperature probe from FIG. 4 in cutaway form.

FIG. 5 shows the temperature probe 1 from FIG. 4 in partially cutaway form. It can be seen in this case that in each case a plurality of the electrodes 211, 212, 311 and 321 are electrically conductively connected to one of the two terminal caps 71 and 72.

Figure 6:
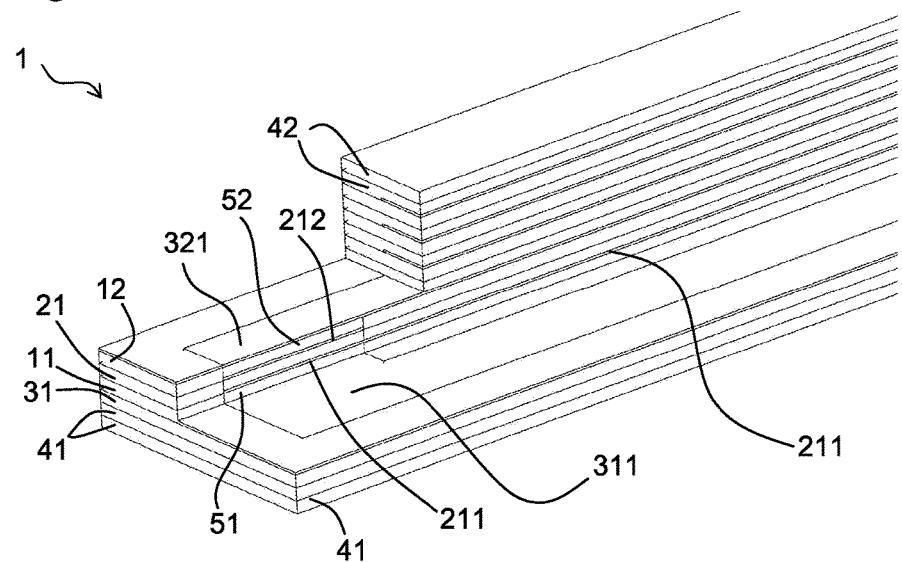
FIG. 6 shows an enlarged illustration of a detail of the temperature probe from FIG. 5.

FIG. 6 shows an enlarged detail of the temperature probe from FIG. 5, in which it can be seen that the temperature probe 1 additionally also has a plurality of fourth ceramic plates 41 and 42, which enclose the first ceramic plates 11 and 12, the second ceramic plate 21, and the two third ceramic plates 31 and 32. A particularly high stability and robustness of the temperature probe 1 can thus be ensured.

The temperature probe 1 has a particularly small structural form together with a very high mechanical strength due to the full ceramic encapsulation of the NTC sensor elements 51 and 52, which is achieved by means of ceramic multilayer technology. Furthermore, the temperature probe 1 is distinguished by very low response times and the possibility of setting resistance tolerances via mechanical machining of the terminal caps 71 and 72.

Figure 7:
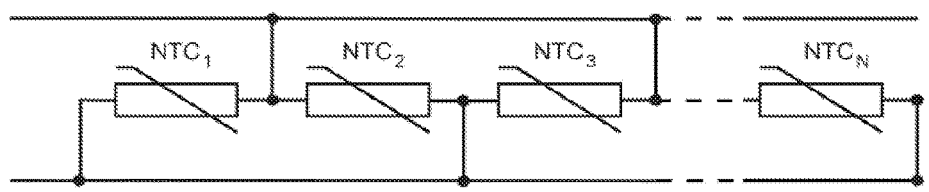
FIG. 7 shows an equivalent circuit diagram of a temperature probe according to a further exemplary embodiment.

FIG. 7 shows an equivalent circuit diagram of a temperature probe 1 having a number of N NTC sensor elements, which are identified with NTC1 through NTCN. By way of the above-described mechanical machining of at least one of the terminal caps 71 and 72, individual NTC sensor elements 51, 52, and 53 can be "deactivated" to set the resistance.

The features described in the exemplary embodiments shown can also be combined with one another according to further exemplary embodiments, even if such combinations are not explicitly shown in the figures. Alternatively or additionally, the exemplary embodiments shown in the figures can have further features according to the embodiments of the general description.

The invention is not restricted thereto by the description on the basis of the exemplary embodiments, but rather comprises every novel feature and every combination of features. This includes in particular every combination of features in the patent claims, even if this feature or this combination is not itself explicitly specified in the patent claims or exemplary embodiments.

We claim:

1. A temperature probe, comprising:
   a plurality of electrodes;
   two first ceramic plates each having an opening in which an NTC sensor element is arranged;
   a second ceramic plate arranged between the first ceramic plates, wherein first electrodes of the plurality of electrodes are respectively arranged between the second ceramic plate and each of the two first ceramic plates, and wherein the first electrodes of the plurality of electrodes each electrically contact an NTC sensor element of a first ceramic plate of the two first ceramic plates; and
   two third ceramic plates, wherein the first and the second ceramic plates are arranged between the two third ceramic plates, and wherein second electrodes of the plurality of electrodes are respectively arranged between each of the third ceramic plates and a first ceramic plate of the two first ceramic plates, the second electrodes of the plurality of electrodes each electrically contacting an NTC sensor element of a first ceramic plate of the two first ceramic plates;
   wherein the NTC sensor elements are each laterally completely enclosed by ceramic plates, and wherein the first, the second, and the third ceramic plates and the NTC sensor elements are formed into a ceramic body by sintering ceramic films and ceramic sensor elements; and
   wherein two terminal caps are applied to the ceramic body, wherein each terminal cap is electrically connected to at least two electrodes of the plurality of electrodes.

2. The temperature probe according to claim 1, comprising:
   a plurality of at least three first ceramic plates each having an opening in which an NTC sensor element is arranged; and
   a plurality of second ceramic plates, wherein each second ceramic plate is arranged directly between two first ceramic plates, first electrodes of the plurality of electrodes for contacting the NTC sensor elements are respectively arranged between each respective second ceramic plate and each of the two first ceramic plates between which the respective second ceramic plate is arranged, and wherein the first and second ceramic plates are arranged between the third ceramic plates.

3. The temperature probe according to claim 1, further comprising two fourth ceramic plates, wherein the first, second, and third ceramic plates are arranged between the two fourth ceramic plates, and wherein the two fourth ceramic plates are formed jointly with the first, second, and third ceramic plates and the NTC sensor elements by sintering ceramic films and ceramic sensor materials to form a ceramic body.

4. The temperature probe according claim 1, wherein the NTC sensor elements have one of the following structures: a perovskite structure comprising the elements Y, Ca, Cr, Al, and O, or a spinel structure comprising the elements Ni, Co, Mn, and O.

5. The temperature probe according to claim 4, wherein the NTC sensor elements have a perovskite structure having the formula $(Y_{1-x}Ca_x)(Cr_{1-y}Al_y)O_3$ with x=0.03 to 0.05 and y=0.85.

6. The temperature probe according to claim 4, wherein the NTC sensor elements have a spinel structure having the formula $Co_{3-(x+y)}Ni_xMn_yO_4$ with x=1.32 and y=1.32.

7. The temperature probe according to claim 1, wherein the first, second, and third ceramic plates comprise aluminum oxide or a glass ceramic.

8. The temperature probe according to claim 1, wherein the first, second and third ceramic plates have a thickness between 10 μm and 100 μm.

9. A method for producing a temperature probe, comprising:
- arranging ceramic sensor materials in an opening in each of two first ceramic films;
- arranging a second ceramic film between the two first ceramic films;
- respectively arranging first electrodes of a plurality of electrodes between the second ceramic film and each of the two first ceramic films between which the second ceramic film is arranged, wherein the first electrodes of the plurality of electrodes each electrically contact ceramic sensor material arranged in a first ceramic film of the two first ceramic films;
- arranging the first and the second ceramic films between two third ceramic films;
- respectively arranging second electrodes of the plurality of electrodes between each of the third ceramic films and a first ceramic film of the two first ceramic films, the second electrodes of the plurality of electrodes each electrically contacting ceramic sensor material arranged in a first ceramic film of the two first ceramic films, wherein the ceramic sensor materials are each laterally completely enclosed by ceramic films;
- sintering the first, the second, and the third ceramic films and the ceramic sensor material to form a ceramic body comprising first, second and third ceramic films and NTC sensor elements; and
- applying at least two terminal caps to the ceramic body such that each of the terminal caps is connected with two electrodes of the plurality of electrodes.

10. The method according to claim 9, wherein the NTC sensor elements are connected in parallel by the terminal caps.

11. The method according to claim 10, wherein the resistance of the temperature probe is set by mechanical machining of one of the terminal caps.

12. The method according to claim 11, wherein the mechanical machining of the two terminal caps is performed by grinding or trimming.

13. The method according to claim 9, wherein the two terminal caps are applied using one of the following methods: partially immersing the ceramic body in a metallization paste, sputtering, flame spraying, or plasma spraying.

14. The method according to claim 9, wherein the ceramic films are produced by a film casting process or a film drawing process.

15. A method for producing a temperature probe, comprising:
- arranging ceramic sensor materials in an opening in each of two first ceramic films;
- arranging a second ceramic film between the two first ceramic films;
- respectively arranging first electrodes of a plurality of electrodes between the second ceramic film and each of the two first ceramic films between which the second ceramic film is arranged, wherein the first electrodes of the plurality of electrodes each electrically contact ceramic sensor material arranged in a first ceramic film of the two first ceramic films;
- arranging the first and the second ceramic films between two third ceramic films;
- respectively arranging second electrodes of the plurality of electrodes between each of the third ceramic films and a first ceramic film of the two first ceramic films, the second electrodes of the plurality of electrodes each electrically contacting ceramic sensor material arranged in a first ceramic film of the two first ceramic films, wherein the ceramic sensor materials are each laterally completely enclosed by ceramic films;
- arranging the first, second and third ceramic films between two fourth ceramic films;
- sintering the first, the second, third and the fourth ceramic films and the ceramic sensor material to form a ceramic body comprising first, second, third and fourth ceramic films and NTC sensor elements; and
- applying at least two terminal caps to the ceramic body such that each of the terminal caps is connected with two electrodes of the plurality of electrodes.

16. The method according to claim 15, wherein the NTC sensor elements have one of the following structures: a perovskite structure comprising the elements Y, Ca, Cr, Al, and O, or a spinel structure comprising the elements Ni, Co, Mn, and O.

17. The method according to claim 15, wherein the NTC sensor elements have a perovskite structure having the formula $(Y_{1-x}Ca_x)(Cr_{1-y}Al_y)O_3$ with x=0.03 to 0.05 and y=0.85.

18. The method according to claim 15, wherein the NTC sensor elements have a spinel structure having the formula $Co_{3-(x+y)}Ni_xMn_yO_4$ with x=1.32 and y=1.32.

19. A temperature probe, comprising:
- a first ceramic plate having an opening in which a first NTC sensor element is arranged and a second ceramic plate having an opening in which a second NTC sensor element is arranged;
- a first electrode, a second electrode and a third electrode;
- wherein the first ceramic plate is located between the first and second electrodes and wherein the first NTC sensor element is electrically contacted by the first and second electrodes;
- wherein the second ceramic plate is located between the second and third electrodes and wherein the second NTC sensor element is electrically contacted by the second and third electrodes;
- a first terminal cap and a second terminal cap, wherein the first electrode and the third electrode electrically contact the first terminal cap and the second electrode electrically contacts the second terminal cap.

* * * * *